United States Patent [19]

Kalavitz et al.

[11] Patent Number: 4,583,566
[45] Date of Patent: Apr. 22, 1986

[54] PRESSURE CONTROL SYSTEM

[76] Inventors: Paul V. Kalavitz, 2658 Pohens, NW., Grand Rapids, Mich. 49504; Ralph R. Griner, 345 Suffield, Birmingham, Mich. 48009

[21] Appl. No.: 523,704

[22] Filed: Aug. 16, 1983

[51] Int. Cl.[4] ............................................. B60C 23/00
[52] U.S. Cl. ............................ 137/101.19; 137/224; 364/183; 307/10 R; 152/416
[58] Field of Search ............... 137/101.19, 224, 487.5; 364/183, 55; 361/167, 187; 307/10 R; 152/415, 416

[56] References Cited

U.S. PATENT DOCUMENTS

| | | | |
|---|---|---|---|
| 2,685,906 | 8/1954 | Williams | 137/224 X |
| 3,402,972 | 9/1968 | Cooper et al. | 137/487.5 X |
| 3,437,312 | 4/1969 | Jenny | 137/101.19 |
| 3,726,307 | 4/1973 | Carman et al. | 137/487.5 |
| 4,212,334 | 7/1980 | Dudar | 137/224 X |
| 4,313,483 | 2/1982 | Brockmann | 137/224 X |
| 4,333,491 | 6/1982 | Knubley | 137/224 X |
| 4,361,825 | 11/1982 | Shockley | 307/10 R X |
| 4,417,312 | 11/1983 | Cronin et al. | 364/183 X |
| 4,456,038 | 6/1984 | Gwaltney et al. | 152/415 X |

FOREIGN PATENT DOCUMENTS

| | | | |
|---|---|---|---|
| 2604318 | 8/1976 | Fed. Rep. of Germany | 152/416 |
| 2096070 | 10/1982 | United Kingdom | 152/416 |
| 537856 | 3/1977 | U.S.S.R. | 152/416 |

Primary Examiner—A. Michael Chambers
Assistant Examiner—John C. Fox
Attorney, Agent, or Firm—Varnum, Riddering, Schmidt & Howlett

[57] ABSTRACT

A highly accurate pressure control system (200) adapted to control fluid pressure in apparatus such as the air pressure in vehicle tires (136) comprises a control module (210) having an air pressure selector (211) for selecting a desired air pressure and a pressure to voltage transducer circuit (230) for generating a signal representative of the actual air pressure. Signals representative of the difference between actual and desired air pressure are applied to comparator circuitry (246, 248) which control output switches (254, 256) for activating an inflate/deflate valve (220) to inflate or deflate the tires (136) so as to achieve and maintain the desired air pressure. Various circuitry of the control module (210) employ reference signals maintained at reference values held constant relative to a common power supply voltage instead of to a ground reference (218), thus minimizing circuit count and power dissipation while providing sufficient current for operating output switches (254, 256).

18 Claims, 5 Drawing Figures

FIG. I (PRIOR ART)

PRESSURE CONTROL SYSTEM

TECHNICAL FIELD

The invention relates to pressure control systems and, more particularly, to systems for controlling the fluid pressure, including air pressure, of fluid-filled apparatus in accordance with a desired fluid pressure.

BACKGROUND ART

Since the advent of inflatable devices and other types of apparatus employing compressed air or other "fluid" medium (hydraulics, etc.), the regulation of fluid pressure within such devices and apparatus has been an important consideration. Many of the early inventions relating to inflatable devices pertained to means for inflating and deflating the devices, such as compressed air supply sources, air pressure regulators, manual, solenoid and pilot operated directional control valves, etc. In addition, various means were developed for measuring the air pressure within such devices, such as pneumatically actuable gauges.

More recent inventions relating to inflatable devices have often combined the functions of measurement and inflation. For example, the Dudar U.S. Pat. No. 4,212,334 issued July 15, 1980 describes a unit having a series connected air supply, solenoid-actuated valve and spring loaded diaphragm to allow inflation of a vehicle tire only if the tire first has a selected minimum air pressure.

Still further, other inventions are directed to more sophisticated regulation of air pressure within inflatable devices and other pneumatic apparatus. That is, these inventions are directed to the regulation of actual air pressure within pneumatic apparatus in accordance with a desired air pressure which, in turn, may be adjustable. It is obvious that one may manually measure the air pressure within a pneumatic apparatus and then activate well-known valve and air supply devices to either add or exhaust air from the pneumatic apparatus. However, accuracy in achieving an exact desired air pressure in this manner can be difficult. In addition, there are instances where automated or remote control of such functions is substantially advantageous.

For example, various types of vehicles having pneumatic tires are adapted for use on differing terrains Such "cross country" vehicles must be capable of operation on both hard surfaces (e.g. paved roads) and soft terrain (e.g. sand dunes, mud, swamp land, etc.).

At high speeds on paved surfaces, it is desirable to have a relatively high tire pressure and small cross sectional area of contact between the tires and the surface. Conversely, on terrain such as sand and mud or swamp land, it is desirable to reduce tire pressure and increase tire/surface contact area. However, it is sometimes difficult and time consuming, if not impossible, for the vehicle operator to leave the vehicle cab and manually inflate or deflate tires. Also, it is difficult to achieve air pressure accuracy by manual operations.

Systems for remotely regulating air pressure in pneumatic tires on cross country and amphibious vehicles are described in the Williams U.S. Pat. No. 2,685,906 issued Aug. 10, 1954 and Brockmann U.S. Pat. No. 4,313,483 issued Feb. 2, 1982. The system described in the Williams patent employs a source of compressed air and a series of pneumatically controlled valves to inflate or deflate a selected number of vehicle tires in accordance with operation of a manually actuable position switch in the vehicle cab. A pressure gauge mounted to the system measures actual tire air pressure. When the actual air pressure attains a desired value, the operator turns off the position switch, thereby causing the valves to cease inflation or deflation of the tires.

The Brockmann system includes a conventional compressed air source connected to a magnetic valve controlled by a signalling relay key and a pressure relief key. A line switch is provided to select a desired air pressure and actuation of the signalling key will cause the magnetic valve to open and control the flow of compressed air to vehicle tires.

The compressed air is supplied through a ring chamber to a parallel connection of a wheel control valve and a relief valve. The wheel control valve is, in turn, connected to the tire. The wheel control and relief valves include spring loaded inner valve heads pnuematically interconnected in a manner so that attainment of maximum tire pressure causes the relief valve to rapidly force the wheel control inner valve head closed. The relief valve also includes a back flow valve head to assist in venting interconnecting air lines.

Another type of vehicle mounted pneumatic control system for regulating the air pressure in pneumatic vehicle tires and allowing the vehicle operator to remotely adjust the tire air pressure is depicted in FIG. 1 as pneumatic tire pressure control system 100. The system 100 is a pneumatically operated system adapted to monitor and adjust the air pressure in vehicle tires so as to maintain a desired air pressure. System 100 may be advantageously employed in cross country vehicles so as to allow the vehicle operator to remotely modify the tire air pressure for purposes of optimizing maneuverability on differing types of terrain.

Referring to FIG. 1, the system 100 is vehicle mounted (the vehicle not being shown) and includes a vehicle air supply source 102. The supply source 102, which can be in the form of an air compressor or other conventional means, supplies air through line 104 to a compressed air receiver 106 The receiver 106 can be in the form of a storage tank or similar facility, and may have multiple uses, such as supplying compressed air to a vehicle brake system (not shown) over a brake air supply line 108.

The compressed air supply 106 is connected to an output main line 107 having a low pressure protection valve 110 in series therewith. The protection valve 110 is well-known in the art of pneumatic system design and provides a means for assuring adequate pressure for the vechicle brake system in the event of an air loss in system 100 beyond the protection of valve 110, where such air loss causes a low pressure condition in the receiver tank 106.

The compressed air output main line 107 is connected to a regulator input main line 112. Main line 112 is connected through a check valve 114 to a parallel connection of separate regulator input lines 116, 117, 118 and 119. The regulator input lines 116–119 are connected as primary input lines to manifold mounted air pressure regulators 122, 123, 124 and 125, respectively. The regulators 122–125 are conventional in design and provide secondary outputs at predetermined desired air pressures. The regulators 122–125 can, for example, provide secondary outputs at 75, 30, 18 and 10 PSI, respectively.

The outputs of regulators 122 and 123 are connected as input lines to a dual inlet, three-position, detented, five-way hand operated directional control valve 128.

Correspondingly, the regulators 124 and 125 have their outputs connected as input lines to a dual inlet, two-position, detented, five-way hand operated directional control valve 130. The directional control valves 128 and 130 are also conventional in design and provide a means for manually selecting a "desired" air pressure corresponding to the output air pressure of one of the regulators 122–125.

Output lines of the directional control valves 128 and 130 are connected as inputs to a triple shuttle valve assembly 132. The shuttle valve assembly 132 has an output air supply line 134 which, during operation of the control system 100, will have a pressure corresponding to the desired air pressure for vehicle tires 136. Air supply line 134 is connected as an input line to a modulator valve 148 comprising a dual inlet, three position, five-way, spring centered, pilot operated directional control valve, the operation of which is subsequently described herein.

The pressure in the vehicle tires 136 is monitored in an air line 138 having a pressure hereinafter referred to as the "actual" tire pressure. Line 138 is connected through a damping orifice 140 and static tank 142 to an air gauge line 144 which, in turn, is connected to a vehicle dashboard mounted air gauge 146. The damping orifice 140 and static tank 142 serve a dual purpose. Namely, the static tank 142 effectively provides a sampling point for determining the actual tire pressure. Secondly, the combination of the damping orifice 140 and static tank 142 provide a means to minimize the effects of pressure transients in the tires 136 due to momentary changes in road and terrain conditions. Line 138 is also directly connected to an air line 139 which, in turn, is connected as an input line to the modulator control valve 148.

Referring again to the compressed air main supply line 107, it is connected to an air supply line 152 which provides a compressed air supply to the inlets of modulator control valve 148. The port supplying air to the inflation port of valve 148 receives its supply directly from line 152. The port supplying air to the deflation port of valve 148 receives its supply through a low pressure protection valve 150 The low pressure protection valve 150, along with bleed orifice 174, protects against unwanted tire deflation. The modulator valve 148 is conventional in design and employs spring loaded diaphragm chambers which effectively compare the desired air pressure in line 134 with the actual air pressure in line 139. Output lines from the valve 148 include an inflate control line 160 and a deflate control line 162. In accordance with the comparison of air pressures on lines 134 and 139, air is supplied to one or neither of the control lines 160 and 162. Lines 160 and 162 are connected to separate spring loaded diaphragm chambers of a three position, three way, spring centered, pilot operated directional control slave valve 170. The slave valve 170 also includes a direct air supply connection through line 149 from the compressed air main supply line 107. An output line 172 directly connects the slave valve 170 to air valves (not shown) on the tires 136.

In operation of pressure control system 100, the vehicle operator will manually manipulate the directional control valves 128 and 130 so as to select a desired air pressure For example, should the vehicle operator select a desired air pressure of 30 PSI, the directional control valve 128 will be positioned so as to allow compressed air from the output of regulator 123 to be applied through the shuttle valve assembly 132 onto air line 134. As previously described, line 134, having an air pressure corresponding to the desired air pressure, applies the air pressure to the associated spring loaded diaphragm chamber of the modulator valve 148. Correspondingly, the actual air pressure of the tires 136 is applied through line 139 to a separate spring loaded diaphragm chamber of valve 148. Valve 148 operates to compare the desired air pressure on line 134 with the actual air pressure on line 139. Should the desired air pressure on line 134 exceed the actual air pressure, the control valve 148 will operate to effectively connect air supply line 152 to the inflate control line 160.

The compressed air flowing in line 160 will cause the slave valve 170 to operate in a manner so as to provide a direct connection of the compressed air supply line 149 to the main tire supply line 172, thereby causing the tires 136 to be inflated. The slave valve 170 remains in an inflation state until the actual air pressure is increased to the desired air pressure level, at which time the modulator valve 148, sensing the air pressure correspondence, will shut off air supply to control line 160.

If the desired air pressure in line 134 were less than the actual air pressure in line 139, the modulator valve 148 would effectively connect the compressed air supply line 152 through the low pressure protection valve 150 to the deflate control output line 162, provided there is a sufficiently high level of pressure in air supply line 152 to pilot the protection valve 150 into an open state. The compressed air in line 162 would thereby cause the slave valve 170 to be connected to main tire supply line 172 in a manner such that air would be exhausted from the tires 136. The slave valve 170 would remain in an exhuast state until such time as the actual air pressure in line 139 were reduced to a value corresponding to the desired air pressure in line 134.

In the system 100 depicted in FIG. 1, the portion shown in dotted lines with numerical reference 154 can be characterized as a tire pressure control assembly which comprises means for manually selecting a desired air pressure and generating a pneumatic signal having an air pressure corresponding to the desired air pressure. The control assembly 154 also comprises means for comparing the desired air pressure signal with a pneumatic signal having a pressure corresponding to the actual air pressure. In addition, the control assembly 154 is responsive to the resultant comparison to control a slave valve 170 so as to selectively inflate or deflate the tires 136 to achieve the desired air pressure.

Although a pneumatic control system corresponding to the previously described control system 100 represents a substantial advance over previously known systems, various types of problems remain with such a system. Although the system 100 has substantial durability and reliability, it would clearly be advantageous to improve the same. Control systems employing mechanical assemblies, pneumatic and other fluid devices are known to be readily susceptible to contamination, wear and resultant breakdown. It is also advantageous to achieve a substantial accuracy of pressure control, particularly at low pressures. In a physically realized system corresponding to system 100, a fairly wide deadband will exist symmetrical about a desired air pressure at which no correction in actual air pressure will occur. The deadband occurring in the system can be influenced by a number of factors such as valve spool clearances, O-ring and seal friction, contamination in the system and operating temperatures. In general, control systems employing pneumatic assemblies, including such elements as flexible diaphragms, can develop significant problems at low operating temperatures due to stiffness of materials and other undesirable phenomena which are known to occur at lower than normal temperatures. These phenomena can be a particular disadvantage in vehicles such as the previously referenced cross country vehicles which must reliably operate in severe environments. Finally, the difficulty of installation on vehicles can also be an important consideration, especially since tire pressure control systems are not commonly be installed on vehicles during factory manufacture.

In control systems for regulating various types of physical parameters, it is known to employ electrical circuitry for purposes of providing signals to control nonelectrical functions. It is also known to employ transducer devices to generate electrical signals having magnitudes representative of the values of nonelectrical physical parameters. For example, in the Knubley U.S. Pat. No. 4,333,491 issued June 8, 1982, an electropneumatic apparatus is described for accurately inflating tires to a predetermined air pressure. The system includes a pressure transducer for measuring the air pressure of a line directly connected to a pneumatic tire of a vehicle and for generating an output voltage proportional to the measured pressure. The resultant voltage is applied to a control unit having manual controls for setting the desired air pressure.

Specifically, the transducer voltage is applied as an input to a voltage/frequency converter circuit which generates a variable frequency output signal. The variable frequency output signal is applied, during one second of each five second interval, to a four stage binary coded decimal counter which provides a count of the number of excursions of the variable frequency signal during the one second interval. Signals are then applied through various digital counting circuits to operate relays which control air being supplied to the tire. In summary, the system operates in five second cycles with separate one second intervals. Air is applied during a first interval and air presure is measured and compared to desired air pressure during a second interval.

The Carman et al U.S. Pat. No. 3,726,307, issued Apr. 10, 1973, also describes the use of a pressure to voltage transducer circuit. The circuit is employed in a system to provide a pilot pressure to a regulator in accordance with a desired pilot pressure so as to regulate fluid from a supply source to a regulated supply storage device.

In the Carman et al system, a voltage representative of the actual pilot pressure is applied through various circuitry to inputs of low and high level comparator circuits. Signals representative of a deadband around a desired pilot pressure are also applied to the comparators. Output signals of the comparators are utilized to drive solenoid operated valves connected to an accumulator diaphragm at an inlet to the fluid regulator. The control circuitry described in the Carman et al patent does not appear to provide for lowering of fluid pressure in the supply storage device.

Although circuitry is known as heretofore described for controlling nonelectrical parameters, the implementation of such circuitry can include problems in addition to those previously described with respect to pneumatic and mechanical control system apparatus for use in apparatus such as tire inflation/deflation assemblies. For example, the circuitry should not exhibit substantial power dissipation requiring heat sinks or other extraordinary means of dissipation. Accordingly, and for purposes of achieving a relatively compact and lightweight design, the designer must attempt to minimize "hardware count". However, the system must also provide sufficient power to operate switching devices capable of switching electromechanical and electropneumatic assemblies. Circuit design considerations for effecting these features are often somewhat opposed to each other.

An important consideration in the design of any control system utilizing electrical signals having polarities and magnitudes representative of actual values of nonelectrical parameters, i.e. analog circuitry, is stability and retention of accuracy, even in the event of phenomena such as power source drift. Similarly, it is highly advantageous to achieve a system control which retains accuracy and does not respond in the event of electrical and nonelectrical transient conditions.

Another problem associated with system control circuits, especially those employing feedback concepts, is the well-known problem of "overshoot" and hunting which can cause a circuit to oscillate around desired values. Furthermore, the means employed for minimizing hunting and overshoot should not add a substantial amount of circuitry to the system. Finally, the system control should provide for a relatively small operational deadband and should provide ease of installation, including the capability of retrofit to existing control systems.

DISCLOSURE OF THE INVENTION

In accordance with the invention, a pressure control system for regulating actual fluid pressure in fluid-filled apparatus in accordance with a selectible desired fluid pressure includes a transducer means connected to the apparatus and responsive to the actual fluid pressure to generate a transducer signal indicative of the magnitude of the actual fluid pressure. First circuit means are connected to a means for selecting the desired fluid pressure and to the transducer means so as to generate electrical valve control signals representative of the polarity of the difference between the desired fluid pressure and the actual fluid pressure in response to the transducer signal. Valve means are responsive to the electrical valve control signals to selectively increase, decrease or maintain the actual fluid pressure in the apparatus in accordance with the desired fluid pressure.

The first circuit means includes a proportional signal generating means connected to the transducer means and to the means for selecting the desired fluid pressure. The proportional signal generating means is responsive to the transducer signal and the particular selected desired fluid pressure to generate a first difference signal having a value proportional to the magnitude and polarity of the difference between the actual and desired fluid pressures. The value of the first difference signal is equal to a nonzero reference level independent of the absolute magnitude of the transducer signal when the difference between the actual and desired fluid pressures is substantially equal to zero.

The first circuit means also includes power supply means for generating power supply voltages, and reference signal generating means connected to the power supply means to generate second and third reference signals having magnitudes of second and third reference levels, respectively. Comparator means connected to the proportional signal generating means and the reference signal generating means compares the difference signal with the second and third reference signals. The comparison means also generates comparison signals in accordance with the results of the comparison.

Also in accordance with the invention, switch means are connected to the comparator means and the valve means. The switch means are responsive to the comparison signals for selectively generating the electrical valve control signals.

The reference signal generating means is responsive to the power supply voltages for generating a first reference signal proportional to the supply voltages. The proportional signal generating means is responsive to the first reference signal to generate the first difference signal. The transducer means is also responsive to the power supply voltages for generating the transducer signal, and variation in the power supply voltages will result in proportional changes in the transducer signal and the first reference signal.

The comparator means are responsive to the magnitude of the difference signals being greater than the second reference level to generate a first comparison signal. In addition, the comparator means are responsive to the magnitude of the difference signal being less than the third reference level for generating a second comparison signal. Switch means are connected to the comparator means and are responsive to the first comparison signal to generate a first one of the electrical valve control signals. The switch means is also responsive to the second comparison signals for generating a second one of the electrical valve control signals. The valve means are responsive to the first electrical valve control signal to activate decrease of the actual fluid pressure. The valve means are further responsive to the second one of the valve control signals to connect a source of fluid to the apparatus so as to increase the actual fluid pressure.

Also in accordance with the invention, the comparator means includes hysteresis means to provide hysteresis about upper and lower values of difference between the actual and desired fluid pressures at which the comparison signals are generated.

The proportional signal generating means includes second circuit means connected to the means for selecting the desired fluid pressure and the transducer means. The second circuit means generates a second difference signal proportional to the difference between actual and desired fluid pressures, and the magnitude of the second difference signal is equal to the first reference level when the actual fluid pressure is substantially equal to the desired fluid pressure.

In one embodiment of the invention, the second circuit means includes a voltage divider circuit connected to the desired fluid pressure selection means. An operational amplifier includes input terminals connected to the transducer means and voltage divider circuit. An output terminal of the operational amplifier is also connected to the voltage divider circuit. The second difference signal is generated on the output terminal and the magnitude of the signal when the actual fluid pressure is equal to the desired fluid pressure corresponds to the magnitude of the transducer signal when the actual fluid pressure is equal to the maximum selectible magnitude of desired fluid pressure.

The proportional signal generating means also includes amplifier means connected to the second circuit means and to the reference signal generating means. The amplifier means are responsive to the second difference signal and the first reference signal to provide gain for the second difference signal and to generate the first difference signal. The magnitude of the first difference signal is equal to the magnitude of the second difference signal when the actual fluid pressure is substantially equal to the desired fluid pressure.

A method in accordance with the invention includes manual selection of a desired air pressure and generation of a transducer signal proportional to the magnitude of an actual air pressure. In addition, a difference signal is generated which is proportional to the magnitude and polarity of the difference between the actual and desired air pressures. The difference signal is compared to first and second predetermined values, and electrical valve control signals are generated in accordance with the results of the comparison to operate the valve control means.

BRIEF DESCRIPTION OF THE DRAWINGS

The invention will now be described with reference to the drawings in which.

BEST MODE FOR CARRYING OUT THE INVENTION

Figure 1:
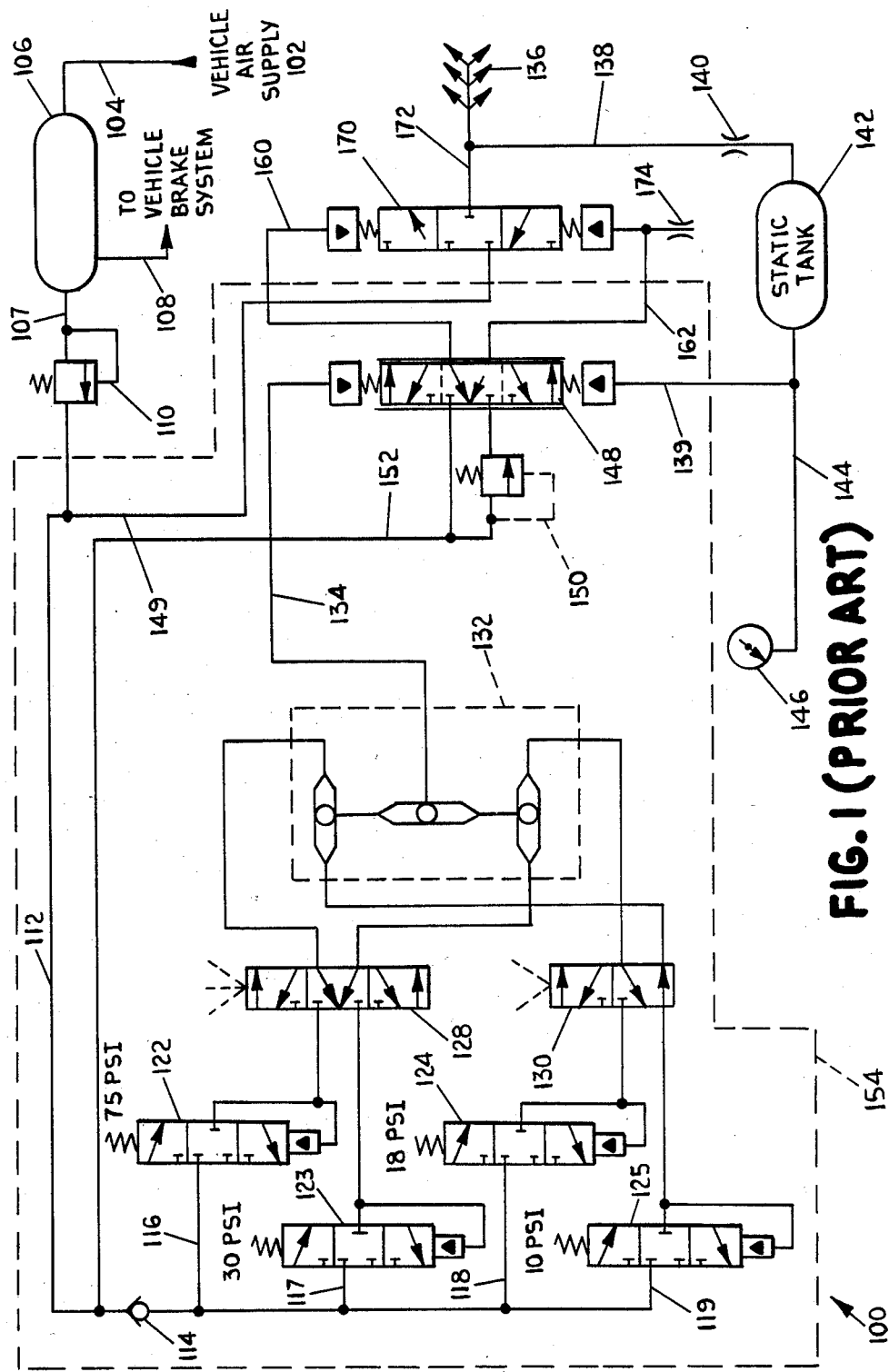
FIG. 1 depicts a pressure control system known in the prior art.
Figure 2:
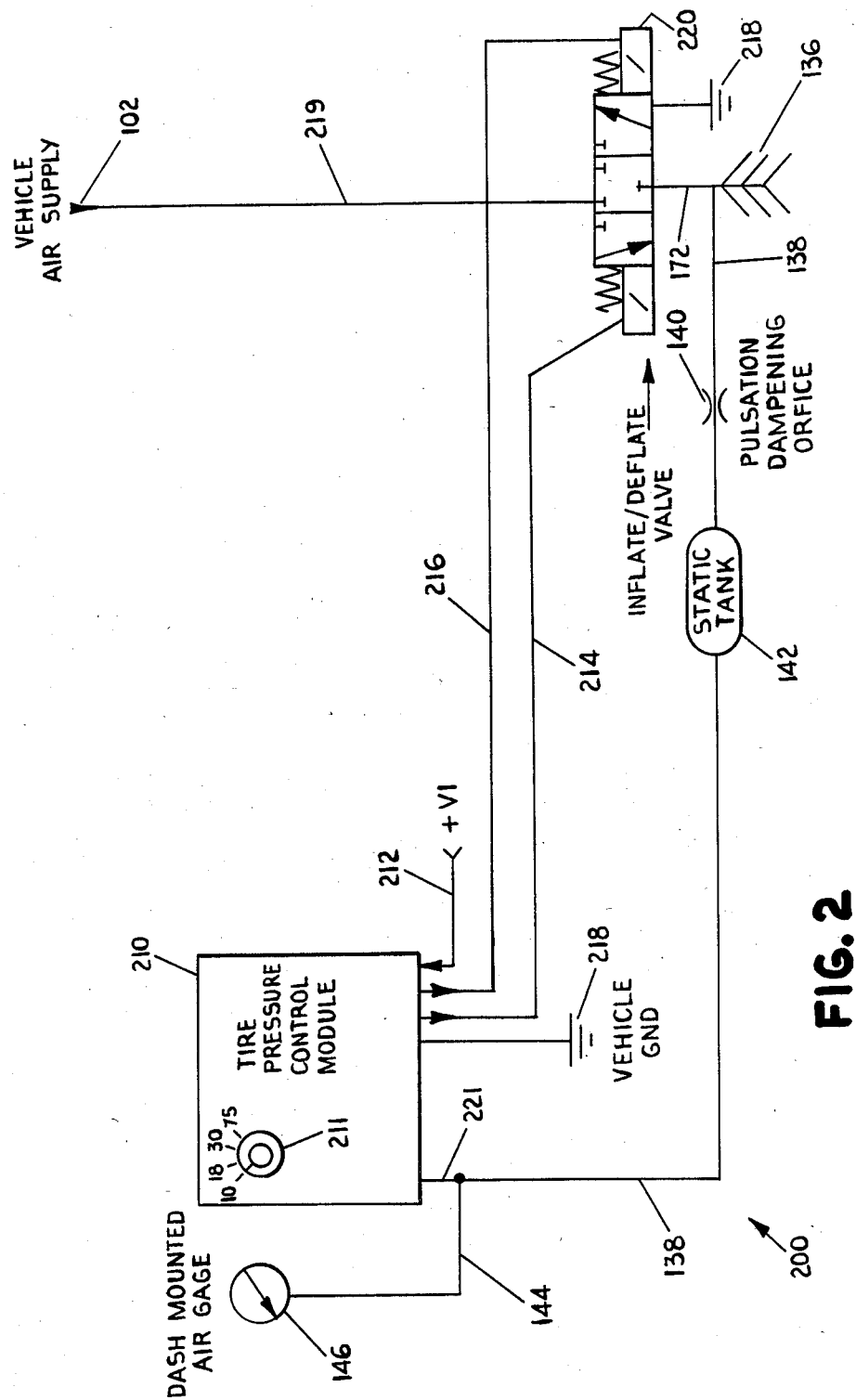
FIG. 2 is a general block diagram of a pressure control system in accordance with the invention.

The principles of the invention are disclosed, by way of example, in a pressure control system 200 depicted in general block diagram form in FIG. 2. Although system 200 is adapted to control air pressures, it should be emphasized that the principles of the invention can be applied to other "fluid" type systems, such as hydraulic systems. As the term "fluid" is used herein, it refers to both liquid and gas mediums. The resultant functions of the pressure control system 200 embodying the principles of the invention correspond to the functions associated with pressure control system 100 depicted in FIG. 1 and described in the section entitled "Background Art". That is, the system 200 can be mounted on a vehicle (not shown) having tires 136 which are to be adjustably inflated and deflated in accordance with manual selection of a desired air pressure by the vehicle operator in the cab of the vehicle. In addition, the system 200 is adapted to substantially maintain the air pressure of the tires 136 at the desired air pressure.

Referring specifically to FIG. 2, a vehicle mounted air supply 102 provides a source of compressed air on line 219 which is connected to an inflate/deflate control valve 220. Inflate/deflate valve 220 is known in the prior art and can comprise, for example, a double solenoid operated, spring centered, three position, three way, internally piloted directional control valve having three selective operating states. In a first state, the valve 220 interconnects air supply line 219 to line 172 so as to provide a feed line to tires 136 for purposes of inflation. In a second state, air supply line 219 is blocked and line 172 is maintained "open" to the atmospheric environment so as to exhaust air from line 172, thus deflating tires 136. The third state of valve 220, which can be characterized as the "unoperated" state, blocks both air supply line 219 and line 172, thereby neither inflating nor deflating tires 136.

Unlike the pneumatically controlled valves 148 and 170 of the system 100 depicted in FIG. 1 and previously described herein, the inflate/deflate valve 220 is operative in response to electrical signals on lines 214 and 216. The signals on lines 214 and 216 are applied as input signals to valve 220 so as to control the operative valve state.

Like the system 100 depicted in FIG. 1, the actual air pressure in tires 136 is maintained in pressure line 138 and fed through a damping orifice 140 and static tank 142. The static tank 142 effectively provides a sampling point for determining actual tire pressure. Correspondingly, the combination of the static tank 142 and damping orifice 140 provide a means to minimize the effects of pressure transients in tires 136 caused by momentary changes in road and terrain conditions.

The actual air pressure in line 138 is fed through a gauge line 144 to an air gauge 146 which may preferably be mounted in a vehicle cab. The actual tire air pressure on line 138 is also fed through line 221 as an input to a pressure control module 210. Module 210 is preferably mounted within the vehicle cab and includes a selector switch 211 which allows the vehicle operator to manually select a desired air pressure for the tires 136. The pressure control module 210 is electrical in nature as subsequently described herein and includes an input connection on line 212 to a vehicle power source V1 for purposes of providing a power supply. In addition, both the control module 210 and inflate/deflate valve 220 include connections to a vehicle chassis ground 218.

In accordance with the invention, the control module 210 is responsive to the actual air pressure of tires 136 as provided on line 221 and a desired air pressure selected by the vehicle operator through manipulation of selector switch 211. In the manner as subsequently described herein, the control module 210 is responsive to the aforesaid to generate electrical signals on lines 214 and 216 so as to control inflate/deflate valve 220 and provide tires 136 with an actual air pressure corresponding to the desired air pressure.

Specifically, when the desired air pressure is less than the actual air pressure by a predetermined magnitude, control module 210 will generate a signal on line 216. The control valve 220 is responsive to the signal on line 216 to exhaust air from line 172, thereby deflating tires 136. Correspondingly, when desired air pressure is greater than actual air pressure by a predetermined magnitude, control module 210 will generate a signal on line 214. Valve 220 is responsive to the signal on line 214 to connect supply line 219 to feed line 172, thereby inflating tires 136.

Figure 3:
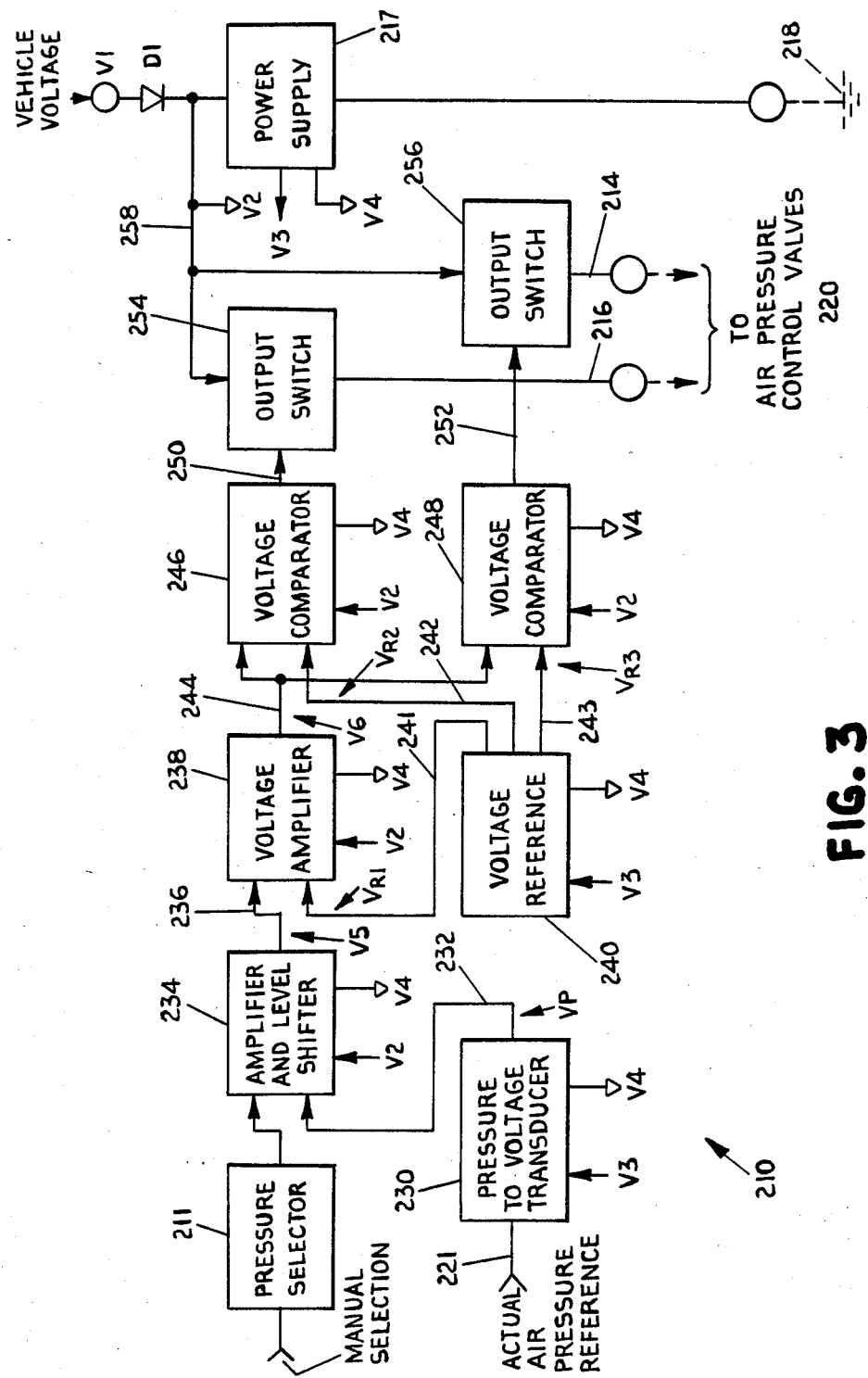
FIG. 3 is a block diagram of a control module in accordance with the invention for the pressure control system depicted in FIG. 2.

A block diagram of the pressure control module 210 is depicted in FIG. 3. Referring thereto, the control module 210 comprises a power supply circuit 217 connected to the vehicle DC power source V1 through a reverse polarity protection diode D1. Voltage V2, corresponding to the voltage on line 258 and equal to the power source voltage V1 less the forward-biased voltage drop across diode D1, is effectively the "positive" bus voltage for the power supply circuit 217. Power supply circuit 217 is substantially conventional in design and adapted to generate two reference supply voltages V3 and V4. The power supply voltage V4 can be characterized as the power supply "common" voltage and is applied to all circuit components within the control module 210, excepting switches 254 and 256.

Unlike many known circuit arrangements employing power supplies for generating various levels of supply voltages, the power supply voltages V3 and V4 are referenced to the positive bus voltage V2. That is, both voltages V3 and V4 are held constant relative to voltage V2. In contradistinction, conventional circuit arrangements typically reference the power supply output voltages to a common ground. However, various circuitry of the control module 210 subsequently described herein utilize "V3-V4" as an input voltage, instead of a power supply voltage referenced to ground. Utilization of this power supply circuit, with voltages V3 and V4 referenced to voltage V2, allows operation of output switches 254 and 256 by comparators 246 and 248, respectively, without requiring additional switch drive circuitry. Accordingly, hardware count and power dissipation is advantageously minimized.

The actual air pressure maintained in air line 221 previously described with respect to FIG. 2 is applied as an input to a pressure to voltage transducer 230. Transducer 230 is conventional in design and responsive to the actual air pressure in line 221 and supply voltages V3 and V4 to generate a voltage output signal VP on line 232. The value of signal VP is indicative of the value of the actual pressure. For example, the signal VP may be proportional to the actual air pressure, but with a nonzero offset for zero pressure. For a constant value of actual air pressure, the signal VP is also proportional to the difference between supply voltages V3 and V4. The transducer 230 is commercially available and can, for example, be implemented using a Series P650 transducer commercially available from Kavlico Corporation of Chatsworth, Calif. Preferably, transducer 230 should be relatively stable and should not be susceptible to long term drift.

The control module 210 further comprises the pressure selector switch circuit 211 which is responsive to manual operation to select a desired air pressure for the vehicle tires 136. As with the system 100 depicted in FIG. 1, switch 211 can provide the vehicle operator with distinct desired pressure levels, such as 10, 18, 30 and 75 PSI. However, any number of pressure levels can be provided in accordance with the invention.

In addition, it is conceivable the selection of a desired air pressure, or other type of "fluid" pressure, may be provided by means other than "manual" operation. For example, the selection may be provided by means such as a computer-based system whereby the system is responsive to various environmental input parameters (external temperature, parameters indicative of terrain, etc.) to select a particular desired air pressure. Accordingly, the principles of pressure control systems in accordance with the invention are not limited to employment of manual selection means.

The selected pressure is functionally applied through subsequently described relay circuitry as an input to a level shift circuit 234. Also applied as an input to the level shift circuit 234 is the transducer output signal VP on line 232. Level shift circuit operates to generate an output voltage signal V5 on line 236 indicative of the difference between actual and desired air pressures, with the actual air pressure represented by input signal VP. When the actual air pressure is equal to the desired air pressure, the output voltage signal is designed so as to be equal to a nonzero offset VREF. VREF, although constant for constant values of V3 and V4, will also be proportional to the difference in voltages V3, V4.

The control module 210 further includes a voltage reference signal circuit 240. Circuit 240 is responsive to power supply voltage V3 and power supply common V4 to generate three reference voltage signals VR1, VR2 and VR3. These reference signals are held constant for constant values of V3 and V4, but are also each proportional to the difference between supply voltages V3 and V4. It should be noted that the transducer output signal VP is also dependent on the difference between power supply voltages V3 and V4. In accordance with one aspect of the invention, the transducer output signal VP is also proportional to the difference in supply voltages V3, V4 for a given value of actual air pressure. The control module 210 is designed so that VREF, the value of output signal V5 from circuit 234 when the actual air pressure is equal to desired air pressure, is equal to the value of reference signal VR1, the equality being maintained independent of the desired air pressure value or the actual power supply voltage outputs Accordingly, aforedescribed components of module 210 are "ratiometric" in design and variations in source voltages will affect circuitry of module 210 in a manner so that accurate air pressure regulation is maintained.

The level shift output signal V5 and the reference signal VR1 are applied as inputs to amplifier circuit 238. Noting that V5 is equal to VREF when the actual air pressure is equal to desired air pressure, the amplifier 238 generates an amplified output signal V6 proportional to the difference between actual and desired air pressures. Furthermore, output signal V6 is equal to reference signal VR1 (which, in turn, is equal to VREF) when the actual and desired air pressures are equal.

The output voltage signal V6 on line 244 is applied as an input to each of two individual voltage comparator circuits 246 and 248. Also applied as inputs to comparator circuits 246 and 248 are reference signals VR2 and VR3, respectively. Reference signal VR2 represents a difference between the actual air pressure and desired air pressure, whereby the actual air pressure is greater than desired air pressure by a magnitude such that tires 136 should be deflated. In operation, a switching signal is generated at the output of comparator 246 on line 250 when signal V6 is greater in magnitude than signal VR2.

The switching signal on line 250 is applied as an input signal to output switch 254. Switch 254, having power supplied from V2 on line 258, is responsive to the switching signal to generate a drive signal on line 216. As previously described with respect to FIG. 2, the drive signal on line 216 will operate control valve 220 so as to cause air to be exhausted from tires 136.

Turning to the second voltage comparator circuit 248, the input reference signal VR3 represents a difference between actual and desired air pressures, whereby the actual air pressure is less than desired air pressure by a magnitude such that tires 136 should be inflated. Accordingly, comparator circuit 248 is operative to generate an output switching signal on line 252 when voltage V6 is negative relative to the reference voltage VR3. In such event, the switching signal on line 252, being applied as an input signal to output switch 256, will cause a drive signal to be applied on line 214 so as to cause operation of valve 220 to inflate the tires 136.

It should be emphasized that reference signals VR2 and VR3, like signal VR1, are also dependent on the difference between power supply voltages V3 and V4. Again, the module 210 is thus ratiometric and accuracy of operation is substantially independent of power supply voltage variations. Furthermore, the utilization of the circuit power supply common V4 being referenced to voltage V2 rather than chassis ground 218 provides a minimization of hardware count and reduced power dissipation.

Figure 5:
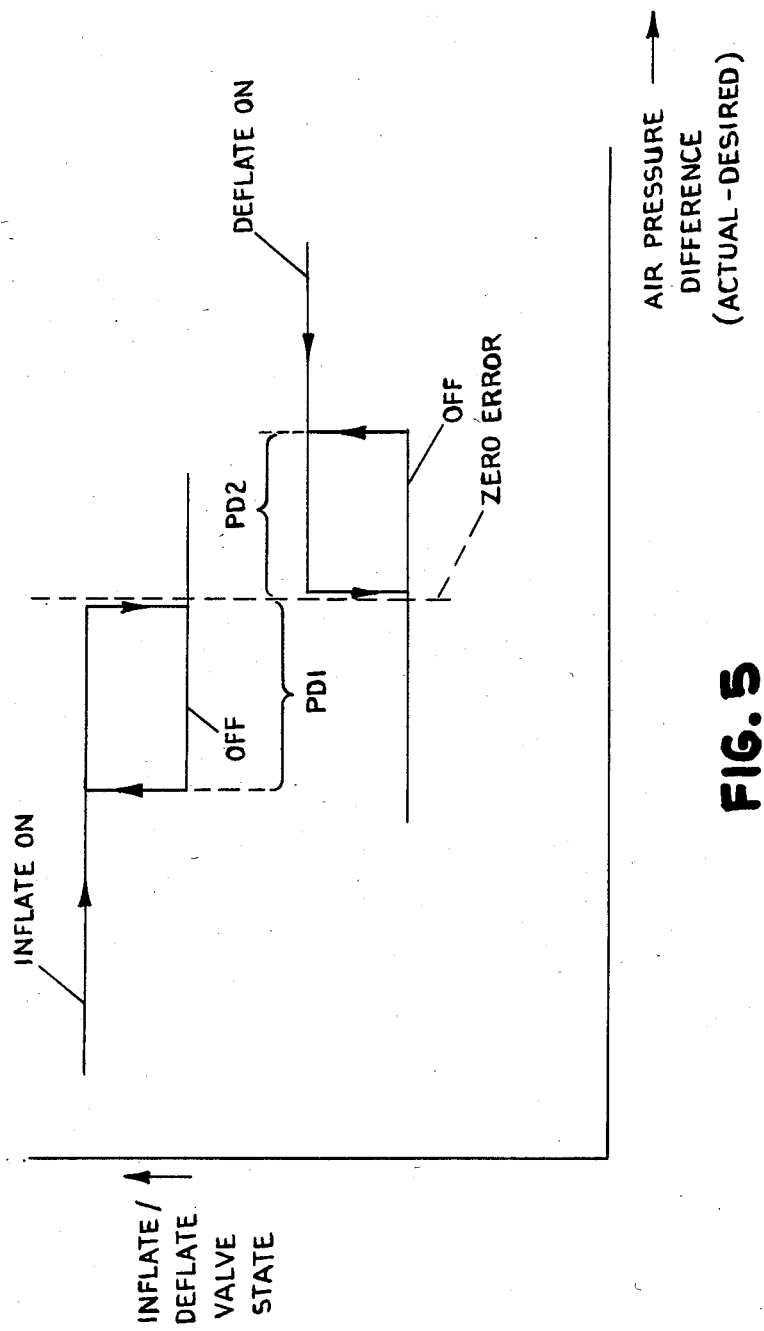
FIG. 5 is an illustrative graph depicting the relationship between activations of inflation and deflation functions by the pressure control system depicted in FIG. 2.

As earlier mentioned, one problem with control systems employing feedback principles to monitor and control a particular variable occurs with regard to the problem of "hunting". To overcome this problem, the control module 210 includes means embodied within the comparator circuits 246 and 248 depicted in FIG. 3 for providing a "hysteresis" effect with respect to inflation and deflation of the tires 136. This concept can best be described by reference to FIG. 5 which depicts a state diagram of the control valve 220 relative to the difference between actual tire air pressure and desired air pressure. With the "zero error" pressure difference level as shown in FIG. 5 and the actual air pressure being less than desired air pressure by a magnitude greater than PD1, the control valve 220 will be operated to inflate the tires 136. When the air pressure difference attains a value at or very near the zero error value, the control valve 220 will be operated so as to cease inflation of the tires 136. However, should the actual air pressure decrease from the zero error pressure level, the control valve 220 will not be operated to inflate the tires 136 until the air pressure difference attains the value PD1. Similarly, should the actual air pressure be greater than desired air pressure by a magnitude greater than a value PD2 as depicted in FIG. 5, the control valve 220 will be operated to decrease the air pressure in tires 136. Deflation of tires 136 will occur until the actual air pressure difference again attains a value at or near the zero error level. However, should the actual air pressure thereafter increase, the control valve 220 will not be operated to deflate the tires 136 until the increased air pressure difference attains the value PD2. In this manner, undesirable circuit and control valve oscillations due to "hunting" are avoided.

Furthermore, with the use of circuitry subsequently described with respect to FIG. 4, the hysteresis circuits employed in comparators 246 and 248 are advantageous over known circuitry. One problem with known circuitry relates to the magnitude of the hysteresis provided between "turn-on" and "turn-off" values. If this magnitude is too small, the system can become effectively unstable in that air pressure differences will move between turn-on and turn-off values too rapidly. On the other hand, increasing hysteresis magnitude can cause known "overshoot" instability. As will be shown in FIG. 4, the specific circuitry utilized with comparator circuits 246 and 248 increases the hysteresis magnitude without correspondingly causing overshoot instability.

Figure 4:
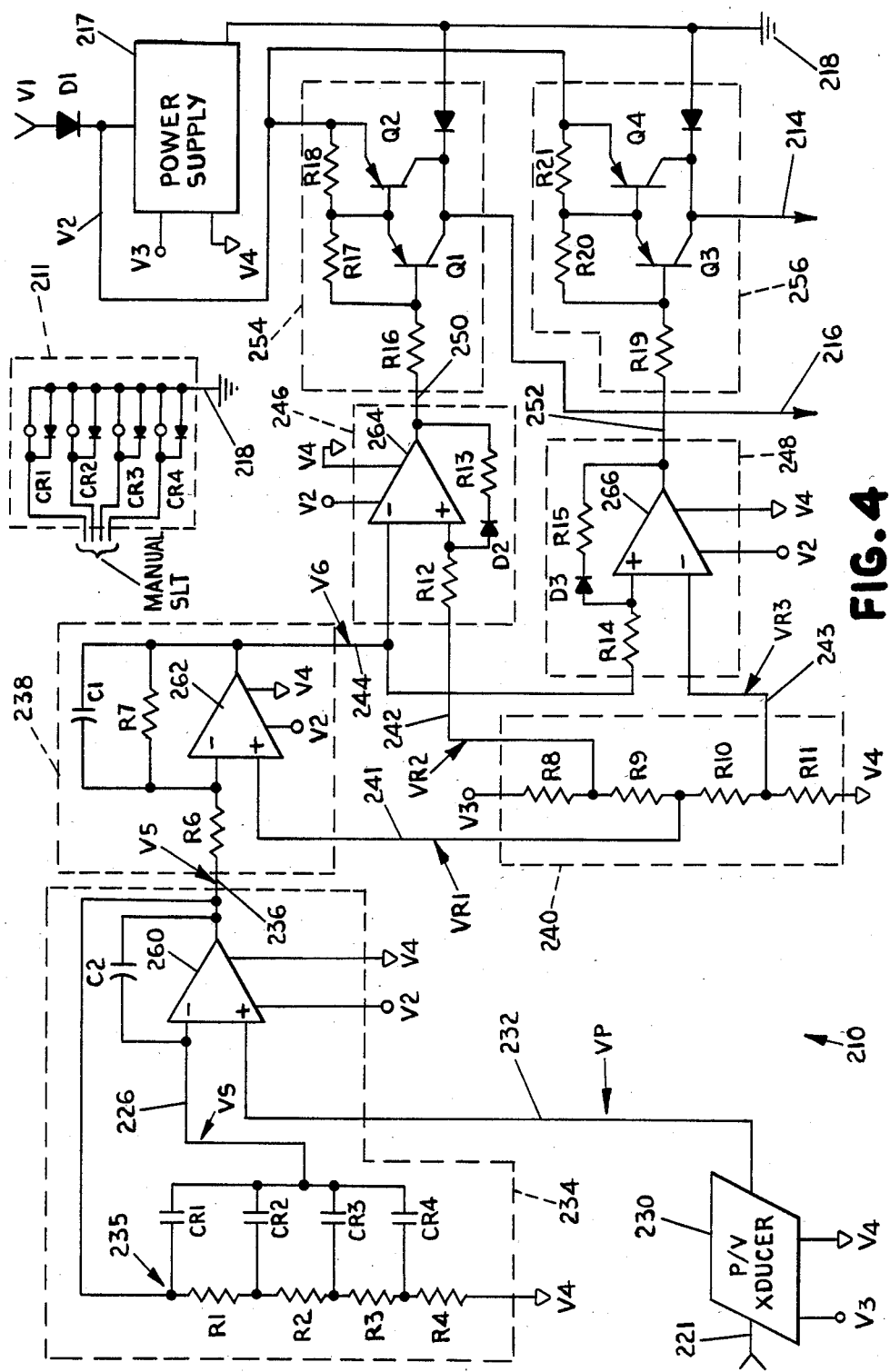
FIG. 4 is a schematic diagram of one embodiment in accordance with the invention of the control module depicted in FIG. 3.

An exemplary circuit in accordance with the invention and corresponding to one embodiment of the block diagram of control module 210 depicted in FIG. 3 is shown in FIG. 4. Referring to FIG. 4, the pressure selector switch 211 can comprise any suitable type of manual or automatically operated selection means comprising a series of switches and associated relay coils CR1–CR4 having parallel connected protection coils to avoid damage caused by inductive surges. Each of the switches corresponds to a particular desired air pressure, with activation of coil CR1 corresponding to a maximum desired air pressure and CR4 corresponding to a minimum desired air pressure.

The switches selectively apply power to the relay coils which, in turn, operate corresponding relay contacts CR1–CR4 which can be characterized as being functionally within the level shifter circuit 234. Preferably, the relays CR1–CR4 comprise known reed relays so as to provide sealed type contacts protected from the external environment. In addition, the relay contacts may preferably comprise gold alloy type contacts which are somewhat immune to oxide formations. These types of contacts are advantageous since the signal levels at which the switching components of module 210 operate are relatively low and do not provide sufficient power to "break down" oxide layers that typically form on many types of conventional contacts. After review of the description herein, it will be apparent to those skilled in the field of switching circuit design that alternative switching means may be employed without departing from the principle novel concepts of the invention. For example, solid state switching arrangements, such as those provided by known FET-type technology, can be utilized in place of the previously described reed relays.

Turning to the level shifter circuit 234, the switch relays CR1–CR4 are interconnected with a voltage divider circuit comprising resistances R1–R4 connected in series between a terminal 235 having voltage V5 and the relatively lower voltage power supply common V4. Operation of switch relays CR1–CR4 will generate a voltage VS on line 226 proportional to V5–V4 in accordance with the correspondingly switched resistance values. Signal VS on line 226 and transducer output signal VP on line 232 are applied as inputs to an operational amplifier 260 having as its output the signal V5 on line 236. A capacitor C2 is connected in parallel with amplifier 260 between lines 236 and 226. Capacitor C2 operates as a low pass filter so as to minimize the effect of switching transients on circuit operation. With signal V5 fed back to terminal 235, the circuit 234 operates as a level shifting circuit which provides the signal V5 proportional to the difference between actual and desired air pressures. As previously described, signal V5 will be equal to a value VREF when the actual and desired air pressures are equal.

The voltage amplifier circuit 238 comprises an operational amplifier 262 having signal V5 input on line 236 through series resistance R6. In addition, reference signal VR1 is applied as an input signal on line 241. The amplifier circuit 238 further comprises a low pass filter and gain circuit configuration connected between the input and output terminals of amplifier 262 and including capacitor C1 and resistance R7. The low pass filter configuration acts to filter out high frequency transients which may be caused in signal V5 by transient conditions in the signals VS and VP appearing on lines 226 and 232, respectively. In addition, circuit 238 will provide a gain to the difference between signals V5 and VR1, the gain having a magnitude substantially equal to the ratio of R7 to R6. As previously described, if the actual and desired air pressures are equal, the signals V5 and VR1 will each be equal to VREF, as will the output signal V6 on line 244.

The voltage reference circuit 240 is provided by a voltage divider circuit comprising resistances R8–R11 and having a high terminal voltage corresponding to power supply voltage V3 and a low terminal voltage equal to power supply common V4. The comparator circuit 246 comprises an operational amplifier 264 having signal V6 input on line 244 and reference signal VR2 input through resistance R12 on line 242.

Comparator circuit 248 is substantially identical in construction to circuit 246, and comprises an operational amplifier 266 with signal V6 input on line 244 through series resistance R14. Reference signal VR3 is applied as an input signal on line 243. The previously described output switching signals on lines 250 and 252 correspond to the output signals of amplifiers 264 and 266, respectively.

As previously described in general terms, and in accordance with one aspect of the invention, the operation of the components of control module 210 heretofore described is ratiometric in design. For example, variations in the power supply 217 or vehicle voltage source V1 may result in corresponding variations in the magnitude of the difference between supply voltages V3, V4. Such variations would, in turn, produce variations in the magnitudes of reference signals VR1, VR2 and VR3. However, with the reference signals VR1–VR3 being provided by a voltage divider circuit having a terminal-to-terminal voltage equal to the difference between V3 and V4, the proportional relationship of the reference signals relative to the supply voltage difference and to each other remains independent of supply voltage variations. Furthermore, the transducer output signal VP, level shifter circuit output signal V5 and amplifier output signal V6 will vary in magnitude proportionally with variations in supply voltage magnitude difference, for a given difference between actual and desired air pressures.

With the ratiometric design as described above, and with the comparator circuits 246 and 248 comparing the amplifier signal V6 with reference signals VR2 and VR3, variations in the supply voltage difference V3–V4 will not affect the accuracy of detecting actual and desired air pressure differences, and regulating the actual air pressure so as to achieve the desired air pressure.

Turning to the hysteresis provided by the comparator circuits 246 and 248, hysteresis effect resistances R13 and R15 are connected in feedback configurations across amplifiers 264 and 266, respectively. The use of such resistances is well known in the art of electrical circuit design. However, the use of such resistances alone does not overcome the previously described problem of instability caused by too small of a magnitude between turn-on and turn-off values. If the resistance values are decreased so as to correspondingly increase the hysteresis range, overshoot can occur.

In accordance with one aspect of the invention, diodes D2 and D3 are connected in series with hysteresis resistances R13 and R15, respectively. The diodes D2 and D3 provide a means for isolating the effects of the hysteresis circuitry from the previously described reference circuitry when a corresponding one of the comparator circuits 246 and 248 is in the "off" state and the corresponding output signal on line 250 or 252 is "high".

Specifically, as an example, when the output signal on line 250 is "high" and comparator circuit 246 and output switch 254 are each in an off state, diode D2 will be reverse-biased, preventing any substantial current from flowing through hysteresis resistance R13, and thereby isolating the input reference circuitry from any hysteresis effect. When the comparator circuit 246 and output switch 254 are each in an "on" state, diode D2 will be in a conducting forward-biased state and hysteresis is thus implemented. Diode D3 operates in an identical manner with respect to comparator circuit 248 and output switch 256. Accordingly, the use of these diodes causes the inflate and deflate switch signals on lines 250 and 252 to remain "on" until the actual air pressure achieves a value very near the center of the hysteresis ranges at the "zero error" position. The hysteresis ranges can thus be increased so as to avoid instability resulting from small range magnitudes without correspondingly causing overshoot.

The output switch 254 comprises resistances R16–R18 and transistors Q1 and Q2 connected in a conventional Darlington configuration whereby a signal of sufficient magnitude on line 250 causes switching current to flow through the collector junctions of transistors Q1 and Q2 on line 216. Similarly, the output switch 256 comprises resistances R19–R21 and transistors Q3 and Q4 connected in an identical Darlington configuration to supply drive current from the transistor collector junctions on line 214 in response to appropriate signals on line 252. It will be apparent to those knowledgable in the art of switching deisgn that not all of the previously described components of output switches 254 and 256, or other circuitry previously described herein, necessarily comprise discrete or otherwise distinct elements For example, commercially available switch configurations corresponding to output switch 254 may comprise a unitized nondiscrete "package" for the components separately illustrated in FIG. 4 as transistors Q1, Q2 and resistances R17 and R18.

As previously described with respect to FIG. 3, the drive signals on lines 216 and 214 operate the inflate/deflate control valve 220 to provide requisite inflation and deflation of the tires 136 to achieve the desired air pressure as selected by the vehicle operator. Accordingly, the functional description of these drive signals and control valve 220 will not be repeated with respect to the description of FIG. 4.

In accordance with the invention, the system control module 210 provides a high degree of accuracy of pressure regulation relative to prior art control systems comprising purely pneumatic and mechanical devices. In addition, the pressure control system 200 comprising control module 210 requires only one mechanical component, i.e. the inflate/deflate control valve 220. The absence of a substantial number of mechanically moving parts reduces the problems of wear and resultant malfunctions.

Furthermore, the control module 210 will readily operate in relatively low temperatures and severe environmental conditions. Finally, the control module 210 is relatively less costly to manufacture and easier to install on vehicles, even when retrofitted to vehicles having existing regulation systems. Control modules in accordance with the invention also have a smaller size and lighter weight than conventional known systems.

It should be noted that various additions and modifications can be made to a pressure control system 200 in accordance with the invention without departing from the novel principles of the invention. For example, the system can employ various types of visual air gauges to indicate to the vehicle operator the actual air pressure of the tires 136. Such air gauges can comprise not only pneumatically activated mechanical components, but can also utilize modern electrical apparatus, such as digital read-out assemblies.

In addition, the control system need not be limited to control of pneumatic devices. The concepts of the invention can be employed in any "fluid" pressure control system, whereby the term "fluid" encompasses pneumatic, hydraulic and various other types of systems for regulating pressure.

It should further be noted that the particular electrical circuit configurations described herein are not meant to be an exhaustive enumeration of the circuit configurations which can be utilized in accordance with the invention. Accordingly, it will be apparent to those skilled in the pertinent art that modifications and variations of the above-described illustrative embodiments of the invention can be effected without departing from the spirit and scope of the novel concepts of the invention.

The embodiments of the invention in which an exclusive property or privilege is claimed are defined as follows:

1. In a pressure control system for regulating the actual fluid pressure in fluid-filled apparatus such as pneumatic devices and the like in accordance with an adjustable desired fluid pressure, wherein the system comprises a source of compressed fluid, means for selecting the desired fluid pressure, valve means connected to the apparatus and selectively connectable to the source of compressed fluid for selectively increasing, decreasing and maintaining the fluid pressure in the apparatus, and control means responsive to the actual fluid pressure and the selection of desired fluid pressure to operate the valve means in accordance with the difference between the actual and desired fluid pressure, the improvement wherein the control means comprises:

transducer means connected to the apparatus and responsive to the actual fluid pressure to generate an electrical transducer signal continuously proportional to the magnitude of the actual fluid pressure;

first circuit means connected to the means for selecting the desired fluid pressure and to the transducer means, and responsive to the transducer signal for generating electrical valve control signals representative of the polarity of the difference between the desired fluid pressure and the actual fluid pressure;

the valve means is responsive to the electrical valve control signal to continuously and selectively increase or decrease the actual fluid pressure in the apparatus until the actual fluid pressure is within a predetermined range of the desired fluid pressure; and the first circuit means comprises proportional signal generating means connected to the transducer means and to the means for selecting the desired fluid pressure, and responsive to the transducer signal and the particular selected desired fluid pressure for generating a first difference signal having a value continuously proportional to the magnitude and polarity of the difference between the actual fluid pressure and the desired fluid pressure during increase and decrease of the actual air pressure.

2. A pressure control system in accordance with claim 1 characterized in that the value of the first difference signal is equal to a nonzero reference level independent of the absolute magnitude of the transducer signal when the difference between the actual and desired fluid pressures is substantially equal to zero.

3. A pressure control system in accordance with claim 1 characterized in that the first circuit means further comprises:

power supply means for generating power supply signals;

reference signal generating means connected to the power supply means for generating second and third reference signals having magnitudes of second and third reference levels, respectively; and comparator means connected to the proportional signal generating means and the reference signal generating means for comparing the first difference signal with the second and third reference signals, and generating comparison signals in accordance with the results of the comparison.

4. A pressure control system in accordance with claim 3 characterized in that the first circuit means further comprises switch means connected to the comparator means and to the valve means, and responsive to the comparison signals for selectively generating the electrical valve control signals.

5. A pressure control system in accordance with claim 1 characterized in that the first circuit means further comprises:

power supply means connected to the transducer means for generating power supply signals;

reference signal generating means connected to the power supply means and to the proportional signal generating means, and responsive to the power supply signals for generating a first reference signal proportional to the power supply signals;

the proportional signal generating means is further responsive to the first reference signal for generating the first difference signal;

the transducer means is further responsive to the power supply signals for generating the transducer signal; and variations in the power supply signal values will result in proportional changes in the transducer signal and the first reference signal so as to maintain accuracy in the operation of the pressure control system in a manner independent of power supply signal variations.

6. A pressure control system in accordance with claim 1 characterized in that the first circuit means further comprises:

power supply means connected to the transducer means for generating power supply signals;

reference signal generating means connected to the power supply means for generating second and third reference signals having magnitudes of second and third reference levels, respectively, wherein the second reference level is greater in magnitude than the third reference level; and comparator means connected to the proportional signal generating means and responsive to the magnitude of the first difference signal being greater than the second reference level for generating a first comparison signal, and further responsive to the magnitude of the first difference signal being less than the third reference level for generating a second comparison signal.

7. A pressure control system in accordance with claim 6 characterized in that the comparator means further comprises hysteresis means for providing hysteresis about upper and lower values of difference between the actual and desired fluid pressures at which the first and second comparison signals are generated.

8. A pressure control system in accordance with claim 7 characterized in that said hysteresis means comprises at least one series connection of a diode and a resistance interconnected within the comparator means so that the diode is forward-biased in the presence of the first comparison signal, and reverse-biased in the absence of the first comparison signal, thereby isolating the effects of the hysteresis means in the absence of the first comparison signal.

9. A pressure control system in accordance with claim 7 characterized in that the valve means is responsive to the first one of the electrical valve control signals to decrease the actual fluid pressure, and further responsive to the second one of the electrical valve control signals to connect the source of compressed fluid to the apparatus so as to increase the actual fluid pressure.

10. A pressure control system in accordance with claim 6 characterized in that the first circuit means further comprises:

switch means connected to the comparator means and responsive to the first comparison signal to generate a first one of the electrical valve control signals, and further responsive to the second comparison signal to generate a second one of the electrical valve control signals.

11. A pressure control system in accordance with claim 1 characterized in that the first circuit means further comprises:

power supply means connected to the transducer means for generating a first power signal and a power supply common signal;

reference signal generating means connected to the power supply means and to the proportional signal generating means for generating first, second and third reference signals having first, second and third reference levels, respectively, wherein each of said reference levels is proportional to the difference in magnitudes of the first power signal and the power supply common signal; and the proportional signal generating means comprises second circuit means connected to the means for selecting the desired fluid pressure and to the transducer means for generating a second difference signal proportional to the difference between actual and desired fluid pressures, wherein the magnitude of the second difference signal is equal to the first reference level when the actual fluid pressure is substantially equal to the desired fluid pressure.

12. A pressure control system in accordance with claim 11 characterized in that the second circuit means comprises a voltage divider circuit connected to the means for selecting a desired fluid pressure, an operational amplifier having input terminals connected to the transducer means and the voltage divider circuit, and an output terminal connected to the voltage divider circuit, wherein the second difference signal is generated on the output terminal and the magnitude of the second difference signal when the actual fluid pressure is equal to the desired fluid pressure corresponds to the magnitude of the transducer signal when the actual fluid pressure is equal to the maximum selectible magnitude of desired fluid pressure.

13. A pressure control system in accordance with claim 11 chracterized in that the proportional signal generating means further comprises amplifier means connected to the second circuit means and the reference signal generating means, and responsive to the second difference signal and the first reference signal for providing gain to the second difference signal and generating the first difference signal, wherein the magnitude of the first difference signal is equal to the magnitude of the second difference signal when the actual fluid pressure is substantially equal to the desired fluid pressure.

14. A pressure control system in accordance with claim 13 characterized in that the first circuit means further comprises:
   comparator means connected to the amplifier means and to the reference signal generating means, and responsive to the magnitude of the first difference signal being greater than the second reference level for generating a first comparison signal, and further responsive to the magnitude of the first difference signal being less than the third reference level for generating a second comparison signal;
   switch means connected to the comparator means and responsive to the first comparison signal to generate a first one of the electrical valve control signals, and further responsive to the second comparison signal to generate a second one of the electrical valve control signals; and
   the valve means is responsive to the first one of the electrical valve control signals to actuate deflation of the fluid-filled apparatus, and further responsive to the second one of the electrical valve control signals to connect the source of fluid to the fluid apparatus so as to increase the apparatus actual fluid pressure.

15. A pressure control system in accordance with claim 13 characterized in that power supply signals for operating active circuitry of the proportional signal generating means, reference signal generating means and comparator means are independent of an absolute ground reference.

16. In a pressure control system mounted to a vehicle for inflating and deflating the actual air pressure of pneumatic vehicle tires in accordance with a desired air pressure adjustably and remotely selected by a vehicle operator, wherein the system comprises a source of compressed air mounted to the vehicle, means mounted within the vehicle cab for selecting the desired air pressure, valve means connected to the pneumatic apparatus and selectively connectable to the source of compressed air for selectively inflating, deflating and maintaining the actual air pressure in the vehicle tires, and control means responsive to the actual air pressure and the selected desired air pressure to operate the valve means in accordance with the difference between the actual and desired air pressures, the improvement wherein the vehicle includes power supply means and the control means comprises:
   transducer means connected to the vehicle tires and to the vehicle power supply means, and responsive to the actual air pressure in the vehicle tires to generate an electrical transducer signal continuously proportional to the magnitude of the actual air pressure;
   first circuit means connected to the power supply means and to the means for selecting the desired air pressure, and responsive to the transducer signal for continuously generating electrical valve control signals representative of the polarity of the difference between the desired air pressure and the actual air pressure; and
   the valve means is responsive to the electrical valve control signals to continuously and selectively inflate or deflate the actual air pressure in the vehicle tires until the actual air pressure is within a predetermined range of the selected desired air pressure.

17. A pressure control system in accordance with claim 16 characterized in that the first circuit means comprises:
   reference signal generating means connected to the vehicle power supply means for generating first, second and third reference signals having first, second and third reference levels, respectively;
   voltage follower means connected to the transducer means and to the means for selecting the desired air pressure, and responsive to the transducer signal and a particular selected desired air pressure for generating a voltage follower signal having a magnitude proportional to the magnitude of the difference between actual and desired air pressures, wherein the magnitude of the follower signal will be equal to the first reference signal when the actual air pressure is substantially equal to the desired air pressure;
   amplifier means connected to the voltage follower means and to the reference signal generating means, and responsive to the follower signal and the first reference signal for generating a difference signal having a magnitude and polarity proportional to the difference between the actual and desired air pressures;
   comparator means connected to the reference signal generating means and to the amplifier means, for comparing the difference signal with the second and third reference signals, and for generating comparison signals in accordance with the result of the comparison; and
   switch means connected to the comparator means and responsive to the comparison signals for generating the electrical valve control signals.

18. A pressure control system in accordance with claim 16 characterized in that the system further comprises:
   an air line connected to the vehicle tires for applying the actual air pressure to the transducer means; and
   damping means connected to the air line for minimizing excursions in the actual air pressure applied to the transducer means, where such changes are .effected by momentary changes in the actual air pressure in the vehicle tires caused by transient road or terrain conditions.

* * * * *